Oct. 11, 1949.  B. P. HAFFEY  2,484,027
TOOLHOLDER
Filed April 4, 1946
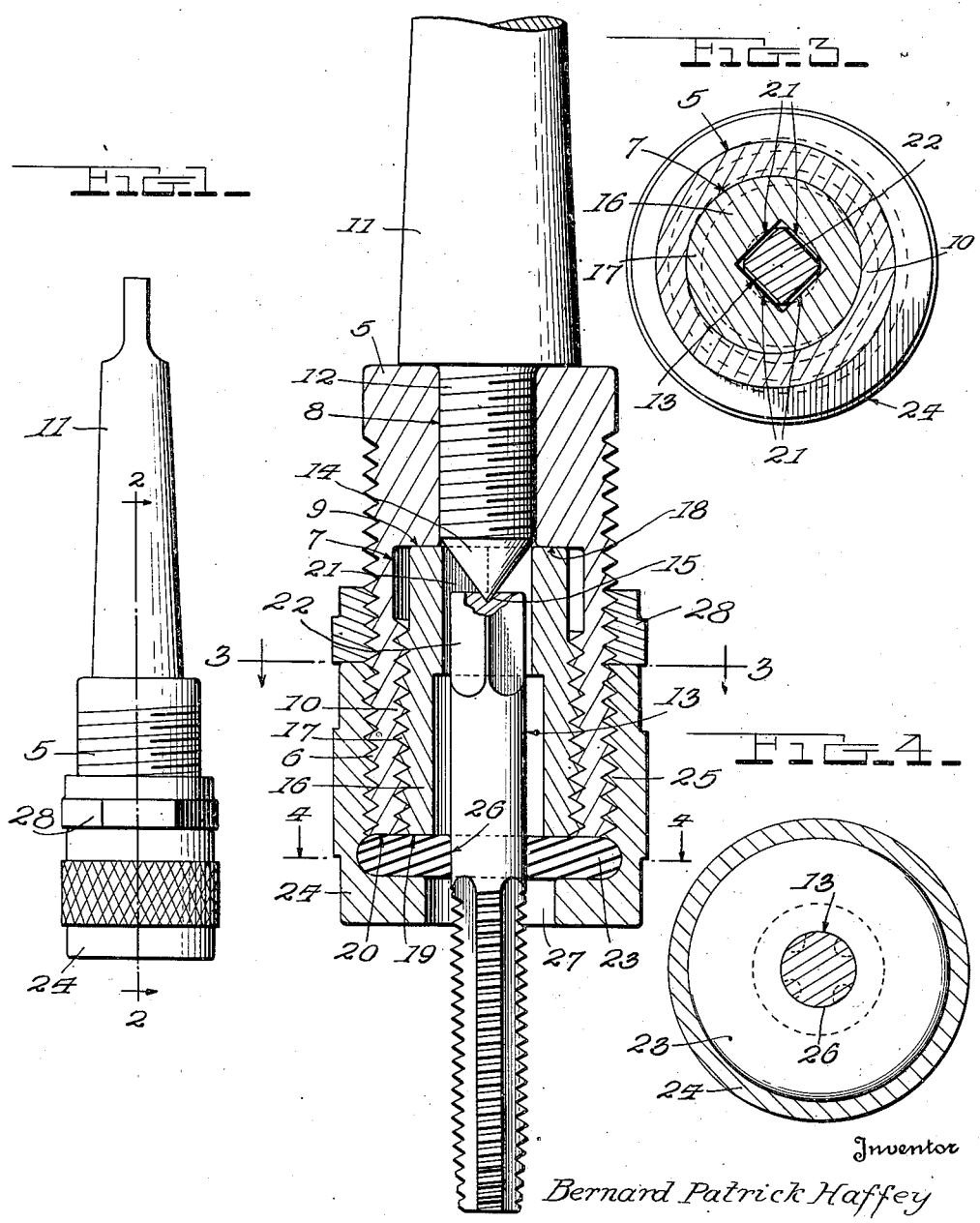
Inventor
Bernard Patrick Haffey
By A. B Foster
Attorney Patented Oct. 11, 1949

2,484,027

UNITED STATES PATENT OFFICE 2,484,027

TOOLHOLDER

Bernard Patrick Haffey, Lakewood, Ohio, assignor to Bernard A. Herren, Bay Village, Ohio Application April 4, 1946, Serial No. 659,633

6 Claims. (Cl. 279—16)

The invention relates to a novel device for holding the shank of a tool, whether said tool is to be driven with respect to the work, or held against rotation while the work is driven, and while the invention finds its principal use for holding a tap or a reamer, it may well be used for holding a drill if the latter be suitably adapted to such holding.

The invention aims to provide a new and improved tool holder which will permit the tool to yieldably float laterally to some extent, which is of advantage whenever the axis of the holder is not precisionally alined with the axis on which the tool must perform its work.

Another object of the invention is to provide a tool holder of this character in which the degree of lateral float of the tool may be varied.

A further object of the invention is to provide a construction which will automatically release the tool when backing it out of the work if it should become locked in the hole, thereby overcoming danger of tool breakage.

A still further object is to provide a novel construction in which a reduced extension on the front end of a shank, not only connects this shank with the head of the tool holder, but carries a center (male or female) to engage a center on the rear end of the tool shank.

Yet another object is to provide a rather simple and inexpensive tool holder, yet one which will be highly desirable and efficient.

Figure 1 of the accompanying drawing is a side elevation.

Fig. 2 is an enlarged longitudinal section, partly in elevation, on line 2—2 of Fig. 1.

Figs. 3 and 4 are transverse sections on lines 3—3 and 4—4 of Fig. 2.

A preferred construction has been shown in the drawing and will be rather specifically described, but attention is invited to the possibility of making variations within the scope of the invention as claimed.

A cylindrical, elongated body 5 is provided, having an external screw thread 6 extending to its front end, said body 5 having a central, cylindrical socket 7 opening through its front extremity, and a central bore 8 from its rear extremity to the rear wall 9 of said socket 7. The side wall of this socket is provided with an internal screw thread 10, this thread being pitched in the same direction as the thread 6, and both of said threads preferably having the same number of turns per inch.

A supporting shank 11 is provided, of either "straight" or tapered form, said shank having a reduced front end 12 threaded tightly into the bore 8. The front extremity of this reduced shank end 12 is formed with a suitable center (either male or female) to engage another center (female or male) on the rear end of the tool shank 13 with which the invention is to be used. In the present disclosure, a conical center 14 is shown on the shank end 12, and the center 15 of the tool shank 13 is the usual conical socket.

A sleeve 16 is provided in the socket 7 to loosely receive the tool shank 13, said sleeve having a screw thread 17 engaged with the thread 10. The rear extremity 18 of this sleeve 16 abuts the rear wall 9 of the socket 7, and the front extremity 19 of said sleeve is flush with the front extremity 20 of the body 5. The rear end of the sleeve 16 is formed with flat internal faces 21 to loosely engage a flat-sided extremity 22 on the tool shank 13, thereby loosely holding the tool and the sleeve 16 against relative rotation.

A disk-like body 23 of elastic material such as neoprene or rubber, lies against the front extremities 19 and 20 of the sleeve 16 and body 5 and is clamped in place by a cap 24 having a thread 25 engaged with the thread 6. The elastic body 23 is formed with a central opening 26 to receive the tool shank 13, said opening 26 being of a size to necessitate forcing of said tool shank therethrough, whereby said body 23 will yieldably grip said tool shank. The cap 24 has an opening 27 larger than the opening 26. Thus, the shank 13 is yieldably held and may float laterally to some extent, permitting proper operation of the tool even if its axis be not exactly alined with the work. The elastic body or disk 23, which as above indicated, may be made of synthetic or genuine rubber, or neoprene or similar elastic material, preferably of an oil resisting nature, may be compressed more or less by screwing the cap 24 on the body 5; and thus it is possible to vary or control the pressure or grip of the elastic material 23 on the tool for the purpose of varying the amount of lateral float of the tool as well as maintaining the tool on the male (or female) center 14. Because of the manner in which the tool is held and turned by the device, the tool operating on the center line of the holder will eliminate cutting eccentrically of the tool holder. In order to maintain the desired compression of the elastic material or body 23, a lock washer 28 may be placed on the threads 6 to be screwed forwardly against the rear end of the cap 24, as shown in Figs. 1 and 2, after the cap has been screwed rearwardly on the body 5 to compress 23 to the desired extent. The lock washer 28 has a portion of its outer surface made of hexagonal or other shape for engagement by a wrench or other turning tool. It will be understood, however, that if desired, the lock washer may not be used and in that event, the threads 6 need not extend as far in a rearward direction as shown in the drawings.

When backing the tool out of the work, should the two become more or less locked together, the cap 24 and the sleeve 16 will unthread from the body 5, if the lock washer is released, thereby releasing the tool and lessening the danger of breaking it. This is particularly advantageous when the tool is a tap for threading the wall of an opening. It will also act in the following manner, by the reversal of sleeve 16 will compress elastic body 23 to allow tool 13 to disengage from socket 21, thereby turning freely and preventing breakage of the tool 13.

From the foregoing and the accompanying drawing, it will be seen that novel and advantageous provision has been made for carrying out the objects of the invention; and while the illustrated construction simply and effectively provides a head having a socket to loosely receive the tool shank, tool-holding means at the rear end of said socket to loosely engage the tool shank, and elastic means carried by said head in advance of said engaging means to yieldably grip said tool shank, it is not necessary that these elements be constructed in the specific manner shown.

I claim:

1. A tool holder comprising a cylindrical body having a central forwardly open socket, a sleeve secured in said socket and of an internal diameter to loosely receive a tool shank, the rear end of said sleeve being of flat-sided form internally to loosely engage a flat-sided rear end of the tool shank, a body of elastic material at the front end of said cylindrical body and sleeve and having a central opening of a size to snugly receive the tool shank, and a cap secured upon the front end of said cylindrical body and clamping said elastic body in place, said cap having a central opening larger than said opening of said elastic body, whereby the tool may laterally float.

2. A structure as specified in claim 1; said sleeve and cap having threaded connections with said cylindrical body, all of the screw threads of these threaded connections being pitched in a direction to loosen if the tool cannot rotate when reversely rotating said cylindrical body for removing the tool from the work.

3. A structure as specified in claim 1; the rear end of said cylindrical body having a central bore opening into the rear end of said sleeve, and a shank having a reduced front end secured in said bore, the front extremity of said reduced shank end having a center to engage a center on the rear end of the tool shank.

4. A structure as specified in claim 1, in which said cap has internal screw threads, adjustably engaging external screw threads on said body, and in which said elastic body is clamped for various degrees of compression between said cap and the front ends of said body and sleeve and a lock nut on the threads of said body for frictional engagement with the rear end of said cap to lock it in adjusted position.

5. A tool holder comprising a head to be driven, said head having a central forwardly open socket, a sleeve secured in said socket and of an internal diameter to loosely receive a tool shank, the rear end of said sleeve having internal means to loosely engage and drive the rear end of the tool shank, a body of elastic material at the front end of said head and sleeve and having a central opening of a size to snugly receive the tool shank, and a cap secured upon the front end of said head and clamping said elastic body in place, said cap having a central opening larger than said opening of said elastic body, whereby the tool may laterally float, said sleeve and cap having threaded connections with said head, all of the screw threads of these threaded connections being pitched in a direction to loosen if the tool cannot rotate when reversely rotating said head for removing the tool from the work.

6. A tool holder comprising a head to be driven, said head having a central forwardly open socket, a sleeve secured in said socket and of an internal diameter to loosely receive a tool shank, the rear end of said sleeve having internal means to loosely engage and drive the rear end of the tool shank, a body of elastic material at the front end of said head and sleeve and having a central opening of a size to snugly receive the tool shank, and a cap secured upon the front end of said head and clamping said elastic body in place, said cap having a central opening larger than said opening of said elastic body, whereby the tool may laterally float, the rear end of said head having a central bore opening into the rear end of said sleeve, and a shank having a front end secured in said bore, the front extremity of said shank end having a center to engage a center on the rear end of the tool shank.

BERNARD PATRICK HAFFEY.

REFERENCES CITED

The following references are of record in the file of this patent:

UNITED STATES PATENTS

| Number | Name | Date |
|---|---|---|
| 797,820 | Peck | Aug. 22, 1905 |
| 1,309,217 | Ratheram | July 18, 1919 |
| 1,346,245 | Palosky | July 13, 1920 |
| 1,831,382 | Gairing | Nov. 10, 1931 |
| 2,116,135 | Bath | May 3, 1938 |
| 2,285,956 | Webber | June 9, 1942 |
| 2,366,778 | Feichter | Jan. 9, 1945 |